US008105006B2

(12) United States Patent
Brewer, III et al.

(10) Patent No.: US 8,105,006 B2
(45) **Date of Patent: *Jan. 31, 2012**

(54) STACKER CART

(75) Inventors: Charles R Brewer, III, Farmington, NY (US); Thomas C Palumbo, Rochester, NY (US); Timothy Kelley, Pittsford, NY (US); Gary A Kelpin, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 330 days.

This patent is subject to a terminal disclaimer.

(21) Appl. No.: 12/257,538

(22) Filed: Oct. 24, 2008

(65) Prior Publication Data

US 2010/0068026 A1 Mar. 18, 2010

Related U.S. Application Data

(63) Continuation-in-part of application No. 12/209,539, filed on Sep. 12, 2008.

(51) Int. Cl.
*B65G 67/00* (2006.01)

(52) U.S. Cl. .................. 414/349; 414/608; 280/33.997; 280/47.35

(58) Field of Classification Search .................. 414/349, 414/608; 280/33.997, 33.998, 47.35
See application file for complete search history.

(56) References Cited

U.S. PATENT DOCUMENTS

| | | | | |
|---|---|---|---|---|
| 3,720,329 | A * | 3/1973 | Gamble | 414/531 |
| 4,266,791 | A * | 5/1981 | Myers | 280/37 |
| 4,283,164 | A * | 8/1981 | Reaney | 414/396 |
| 4,288,195 | A * | 9/1981 | Brewer | 414/608 |
| 4,610,445 | A * | 9/1986 | Schneider et al. | 271/160 |
| 4,668,148 | A * | 5/1987 | Sample et al. | 414/790.8 |
| 5,152,655 | A * | 10/1992 | Pipes | 414/344 |
| 5,186,479 | A * | 2/1993 | Flowers | 280/47.35 |
| 5,404,817 | A * | 4/1995 | Cuff | 101/232 |
| 5,452,983 | A * | 9/1995 | Parmley, Sr. | 414/345 |
| 5,503,517 | A * | 4/1996 | Derby | 414/814 |
| 6,179,499 | B1 * | 1/2001 | Beretta et al. | 400/605 |
| 6,206,424 | B1 * | 3/2001 | Edwards et al. | 280/845 |
| 7,798,501 | B1 * | 9/2010 | Hopkins | 280/47.35 |

* cited by examiner

*Primary Examiner* — Scott Lowe
(74) *Attorney, Agent, or Firm* — Ellis B. Ramirez; Prass LLP

(57) ABSTRACT

This is a stacker cart useful to collect a paper stack in a paper-handling system. The stacker cart has movables so that it can be moved into and out of a housing in the system. At a top section of the stacker cart is a transfer plate that receives the paper stack after processing, finishing, or marking. This transfer plate and the stacker cart have on their lower surface movables that allow both easy moving of the slidable plate off the stacker cart and easy moving of the stacker cart from one location to another. The transfer plate has at least one hook that is connected to a rope or for moving the transfer plate to a second surface. The movables used in both the transfer plate and the stacker cart can be wheels, slides, or bearings.

15 Claims, 11 Drawing Sheets

STACKER CART

CROSS REFERENCE

This application is a Continuation in Part application of parent application Ser. No. 12/209,539 filed in the US Patent and Trademark Office on Sep. 12, 2008.

This invention relates to electrophotographic marking systems and, more specifically, to paper stacker plates or carts used in such systems.

BACKGROUND

While the present invention can be effectively used in a plurality of paper-handling or marking systems, it will be described for clarity as used in finisher modules of electrostatic marking systems such as electrophotography. In an electrostatographic reproducing apparatus commonly used today, a photoconductive insulating member may be charged to a negative potential, thereafter exposed to a light image of an original document to be reproduced. The exposure discharges the photoconductive insulating surface in exposed or background areas and creates an electrostatic latent image on the member which corresponds to the image areas contained within the original document. Subsequently, the electrostatic latent image on the photoconductive insulating surface is made visible by developing the image with a developing powder referred to in the art as toner. During development, the toner particles are attracted from the carrier particles by the charge pattern of the image areas on the photoconductive insulating area to form a powder image on the photoconductive area. This image may be subsequently transferred or marked onto a support surface such as copy paper to which it may be permanently affixed by heating or by the application of pressure. Following transfer of the toner image or marking, the copy paper may be removed from the system by a user or may be automatically forwarded to a finishing station where the copies may be collected, compiled and stapled and formed into books, pamphlets or other sets. This invention will be described throughout in reference to paper collected after the finishing station processes are completed. It should be understood, however, that the present invention can be used in any systems where paper is collected in paper stacks.

As above noted, there are many marking systems that transport paper or other media after the paper is marked in marking step or steps. These marking systems could include electrostatic marking systems, non-electrostatic marking systems and printers or any other system where paper or other flexible media or receiving sheets are transported internally to an output device such as a finisher and compiler station or stations and the subsequent stacking of paper after the compiler completes its functions.

These electrostatic marking systems have finisher and compilers located at a site after the receiving sheets (paper) have been marked with a toner. After finishing is completed, the paper is conveyed to a paper-stacking device generally conveniently located at a bottom portion of the finisher module of a marking machine. A stacking cart generally used is movable so that it can be moved into and out of the finisher module when loaded with paper. Current paper stacking involves the use of carts on casters for compiling paper stacks in printers. Once the carts are loaded, a manual process of unloading small stacks at a time from the main stack is needed. The entire stack cannot be unloaded or staged at once.

SUMMARY

The present invention involves a very low profile paper-sliding or transfer plate to allow stacks of paper to accumulate on the resident stack plate or cart. Once the stack plate cart is filled to capacity, the stack-sliding or transfer plate, using bearings, wheels or sliders (i.e., "movables" can be simply off loaded from the stack cart onto a portable lift device.

Current paper stacking involves the use of stacker plates carts on casters for compiling paper stacks in high volume printers. This invention proposes a very low profile, intermediate paper-stacking transfer plate positioned on top of the stacker plate, to allow stacks of paper to accumulate on a resident stack cart. Once the stack plate or cart is filled to capacity (or job completion), the transfer plate, using wheels, bearings or low profile UHMW (ultra high molecular weight) bearing surfaces similar to furniture moving glides, can be simply "off loaded" from the cart onto a second support or device such as a portable lift device. With the unique characteristics of these sliding bearings (low profile, non-directional, contaminate resistant), it creates a long lasting, large potential capacity, easily moved plate that can transport and unload from a paper cart or pullout paper drawer. This invention provides an improvement to the prior stacker cart systems.

The stacking plate or cart of this invention has sliders, bearings or wheels (or other movables) for easy installing and removal from the marking machine. It has two or more openings into which an upright handle can be inserted when moving this plate or stacking cart. On the upper paper-receiving surface portion of the stacker plate or cart is a detachable sliding or transfer wheeled plate that supports the paper stack and is easily off loaded onto another structure. This sliding or transfer plate has on its bottom surface a plurality of sliders or wheels or bearings, the sliders similar to those used on the bottom of furniture such as Magic Sliders (a trademark of Magic Sliders, L.P.), 50 Main St., While Plains, N.Y. 10606; or wheels such as on office chairs, or movable bearings. Various size and shape slides or wheels can be used varying from 10 mm to about 100 mm. The transfer or sliding plate, depending on its size, can have from 3 to 12 slides, wheels or bearings attached to its bottom face. Located around the sides of the transfer or sliding plate are cutout or slot portions which accommodate and define various size of paper that may be stacked on its upper surface. Clamps inserted into these slots will hold the paper stacks in place. There can be any suitable number of slots in the sliding plate but at least 2 slots. The sliding or transfer plate fits into stacker carts so that no re-engineering of present structures is required for use in present marking machines. Once the desired stack of paper is on the transfer or sliding plate (supported by the movable stacking plate or cart), the stacking plate or cart is pulled out of the marking machine and the paper moved via the transfer or sliding plate off the stacking plate or cart. For example, it can be transferred to the lifting mechanism and tilting plate of co-pending application, Ser. No. 12/209,287 which is incorporated by reference into the present disclosure.

The stacker cart or assembly of this invention has on its upper receiving surface the transfer or sliding plate which will receive the papers and paper stack after they are processed. The transfer or sliding plate, as above noted, has wheels, bearings or sliders ("movables") on its lower surface, has slots on its sides that define various paper sizes and at least one hook on one of its four sides. The slots are used together with clamps to hold the paper stack in position on the transfer or sliding plate. The transfer or sliding plate may be made from plastic, metal, wood, a combination of these or any other suitable material. The sliders on the bottom surface of the transfer or sliding plate may be made from any smooth, hard and slidable material such as that in the earlier-mentioned "Magic Sliders" obtainable from Magic Sliders, L.P. of White Plains, N.Y. 10606. The wheels and bearings on the bottom surface of the transfer or sliding plate can be any suitable wheels or bearings. By "movables" throughout this disclosure and claims includes wheels, slides, and bearings alone or in combination.

DETAILED DISCUSSION OF DRAWINGS AND PREFERRED EMBODIMENTS

Figure 1:
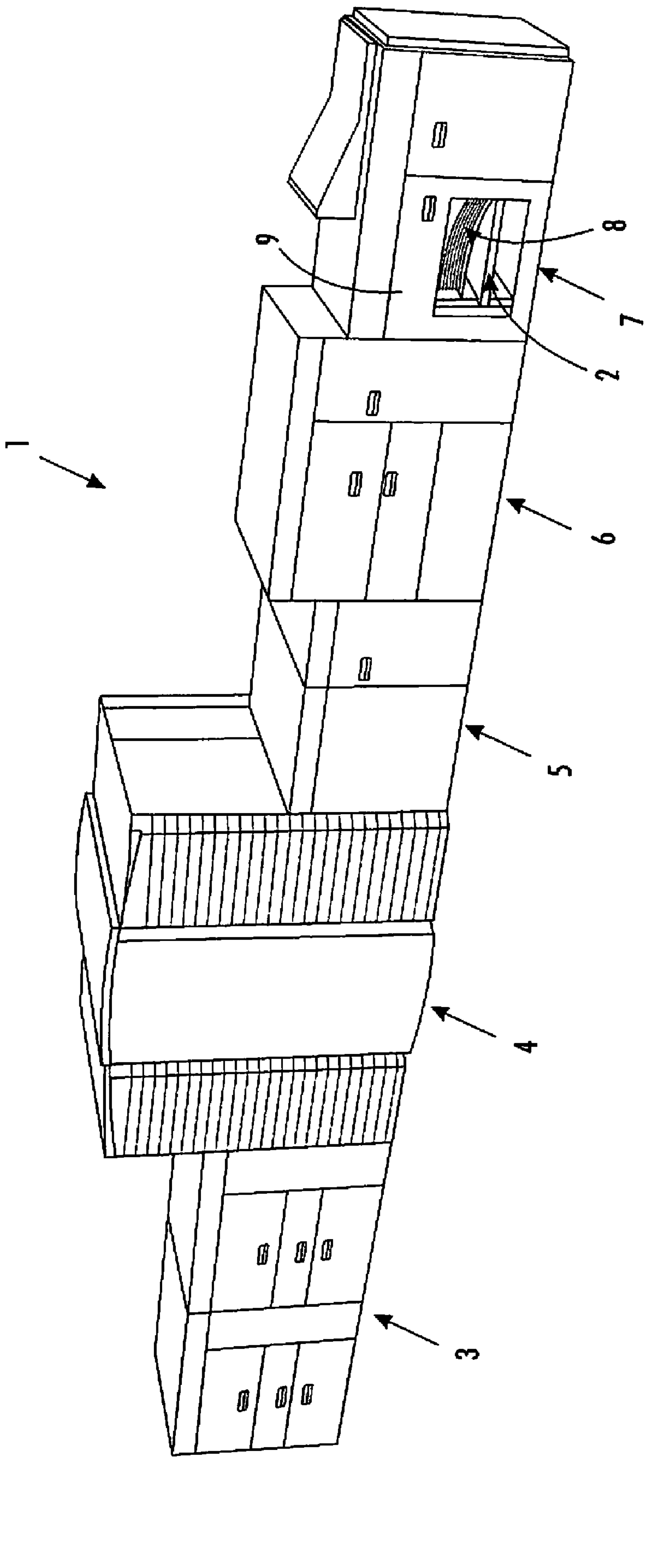
FIG. 1 illustrates a typical marking and compiler apparatus in which the finisher stacker plate or cart of this invention can be used.

In FIG. 1, a typical marking-finisher system 1 is shown where the stacker cart 2 of this invention can be used together with any other system where paper is stacked and subsequently removed. This marking-finisher system 1 comprises a paper feeder module 3, a printing module 4, an inverter module 5, an inserter module 6 and a finisher module 7. The finisher module 7 contains the stacker plate or cart 2 of this invention. The finished paper stack 8 supported on the stacker plate or cart 2 of this invention can be seen through door 9. Once door 9 is opened, the stacker plate or cart 2 of this invention can be removed.

Figure 2:
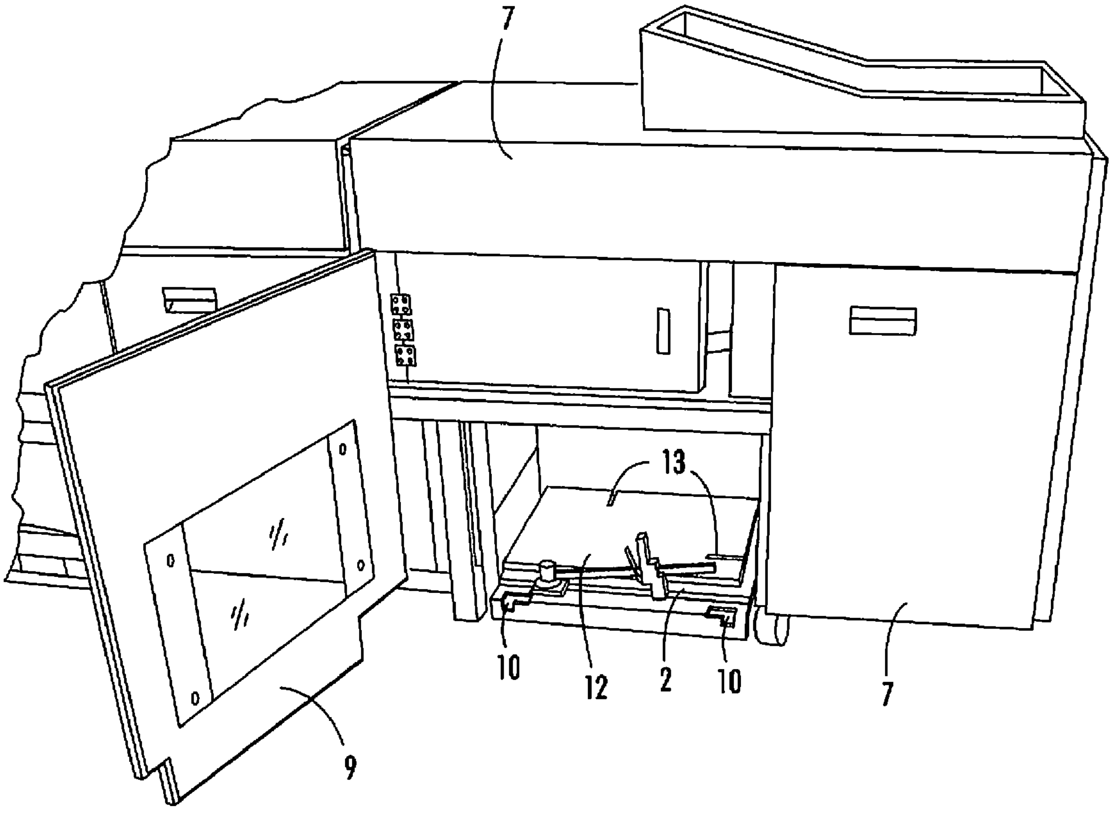
FIG. 2 illustrates an embodiment of this invention where the stacker cart has as its upper portion a transfer plate when installed in the marking-finisher machine or module but without a paper stack.
Figure 3:
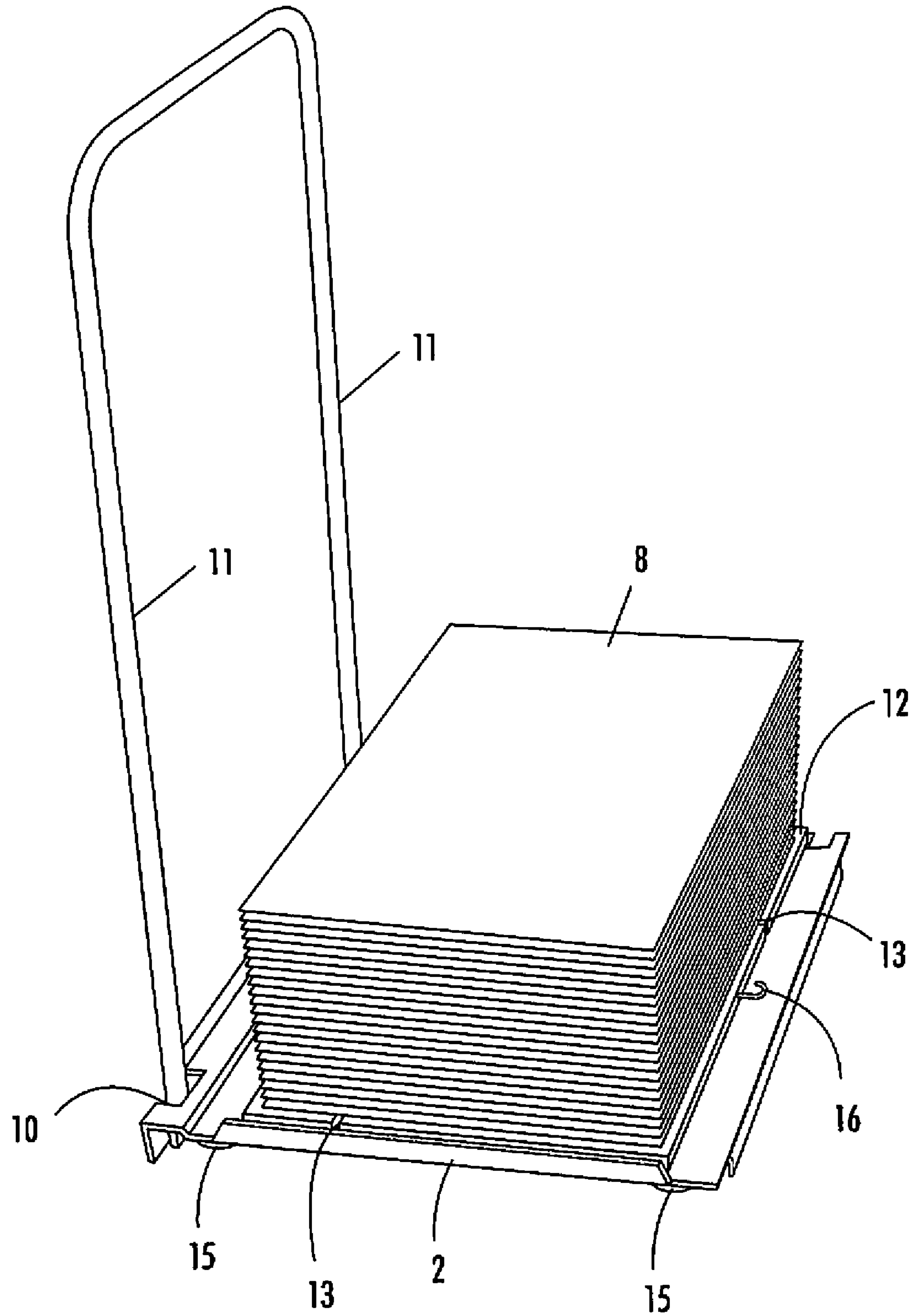
FIG. 3 illustrates an embodiment where the stacker cart with its upper surface containing the transfer plate as it is removed from the marking machine with a paper stack in place.

In FIG. 2, the stacker cart 2 or stacker plate of this invention is shown installed in finisher module 7 before the accumulation of a paper stack 8. When door 9 is opened, as shown in this Figure, the stacker cart 2 which is on movables (not shown) can be removed from the finisher module 7. There are apertures 10 in the front of stacker plate or cart 2 into which a remover handle 11, shown in FIG. 3, is inserted to pull the stacker cart 2 from the finisher module 7. The upper surface of the stacker cart 2 comprises a transfer plate 12 having slots 13 to accommodate various size paper and clamps. Clamps 14 (shown in FIG. 5) hold the paper stack 8 in place.

In FIG. 3, the stacker plate or cart 2 of this invention is removed from finisher module 7. The wheels, bearings or sliders 15 and handle 11 permit easy removal of stacker cart 2 from the finisher module 7. The paper stack 8 is held in place by clamps 14 shown in FIG. 5. The transfer plate can be pulled off the stacker cart 2 and placed on any receiving surface convenient to the user. The paper stack 8 with the transfer plate 12 with its movables is easily pulled off the stacker cart 2 by the use of at least one hook remover 16 (or any other suitable removal means). Once transfer plate 12 and paper stack 8 are removed, the empty stacking cart 2 with another transfer plate 12 can be reinserted into the finishing module 7.

Figure 4:
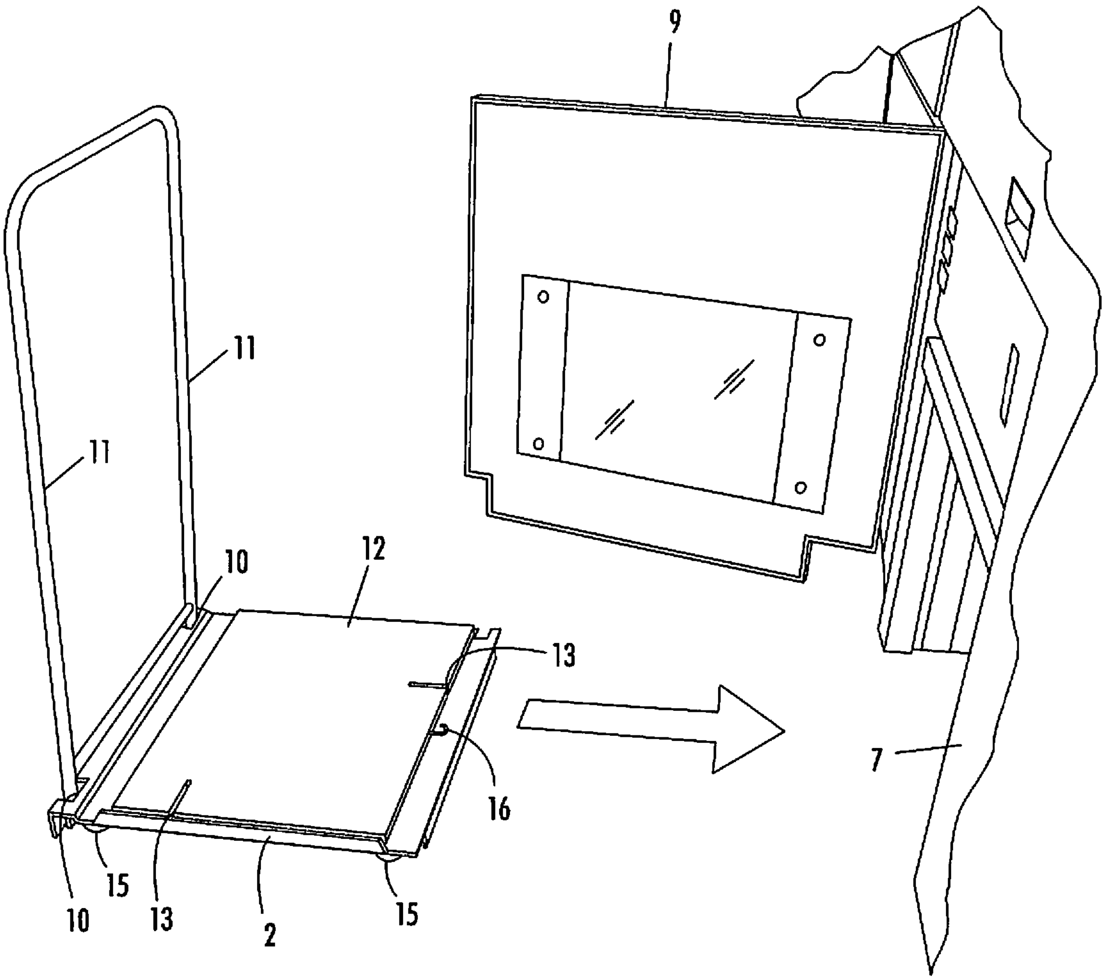
FIG. 4 shows the stacker cart with the transfer plate upper surface when it is removed from finisher module of the marking machine without a paper stack.
Figure 9:
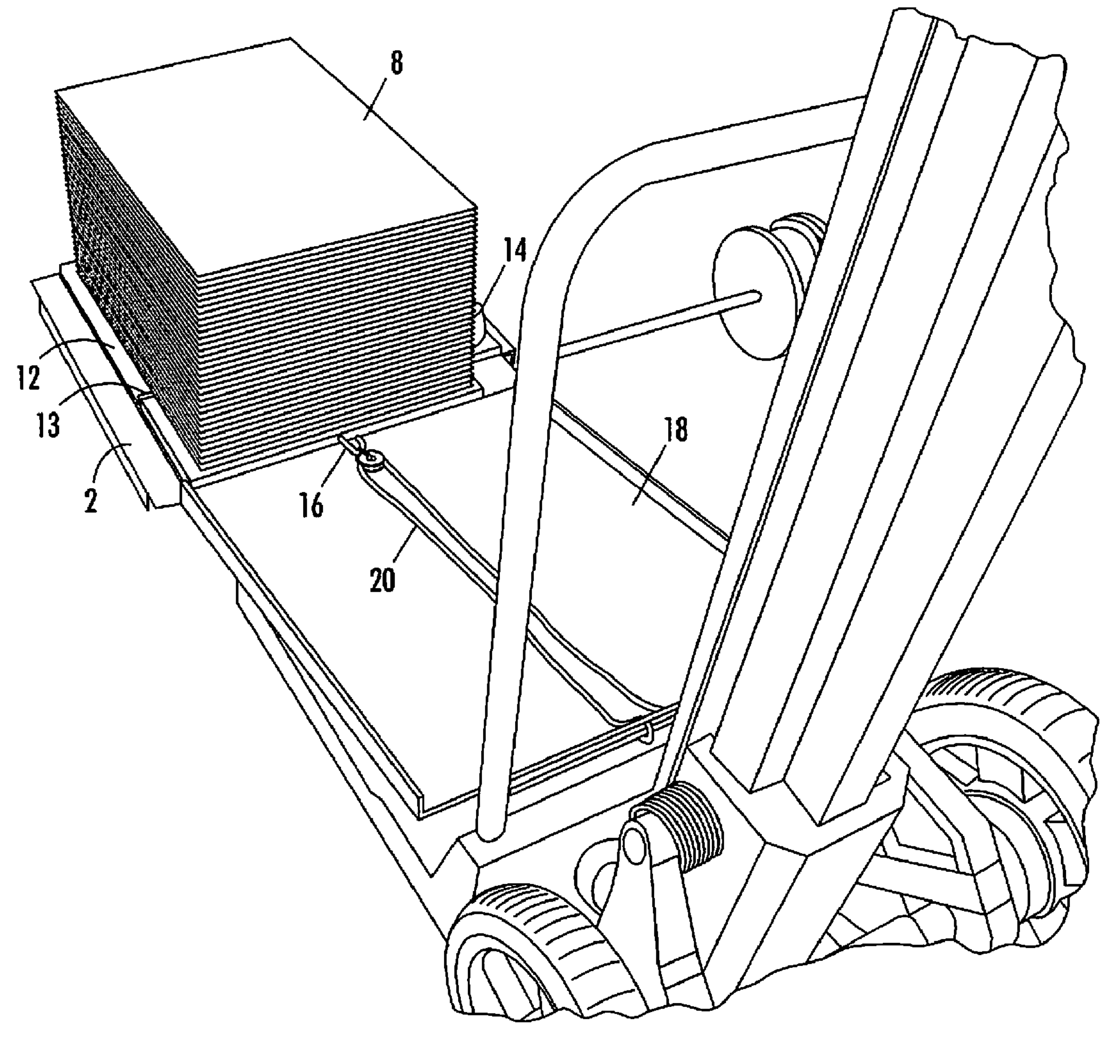
FIG. 9 illustrates the stacker cart as the stacker plate is being removed from the stacker cart to another surface.

In FIG. 4, the stackless stacker cart 2 is shown where the transfer plate 12 has only two slots 13, however, any suitable number of slots 13 may be used. When the paper stack 8 is removed, the emptied stacker plate or cart 2 is pushed via wheels 15, sliders or bearings 21 back into the finishing module for a second collection of paper. Once stacker plate cart 2 is reinserted into finisher module 7 (or any other paper collecting structure), handle 11 is removed from apertures 10. The transfer plate 12 has at least one hook 16 on one of its outer side surfaces to accommodate pulling sliding plate 12 off the stacker cart 2 as shown in FIG. 9.

Figure 5:
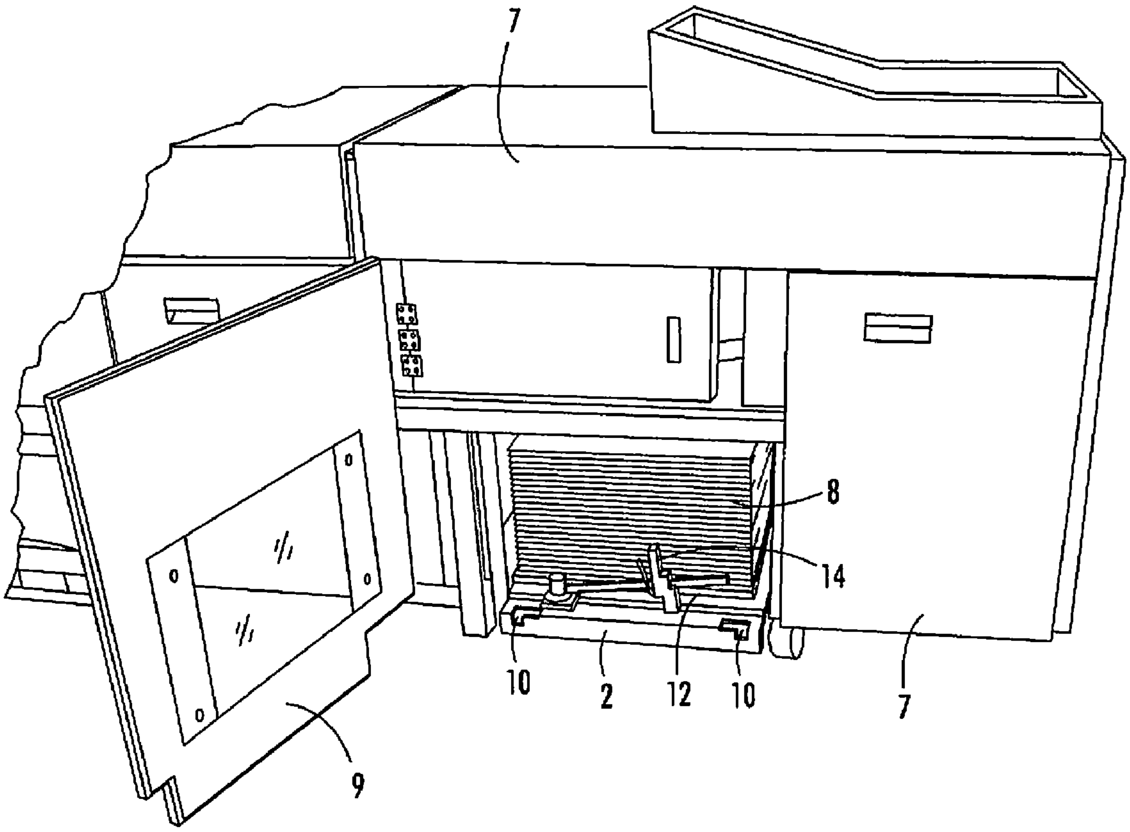
FIG. 5 illustrates the stacker cart when installed in the finisher module with a paper stack and ready to be removed from the finisher module.

In FIG. 5, a stacked stacker cart or plate 2 is shown just prior to removal from finisher module 7. Clamps 14 hold the stack 8 in place while being removed. The paper stack 8 rests on the transfer plate 12 until removed to be placed upon another surface by the user. The handle 11 is then reinserted into apertures 10 to remove the stacker plate or cart 2 from the marker-finisher module 7.

Figure 6A:
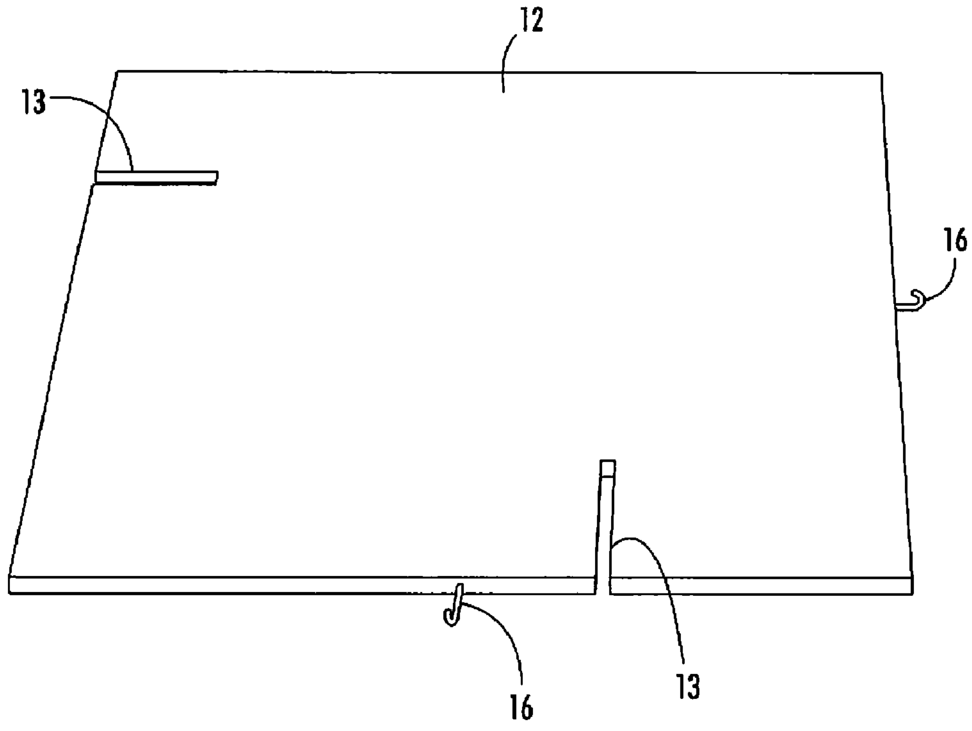
FIG. 6A illustrates the upper surface of the transfer plate of the stacker cart.
Figure 6B:
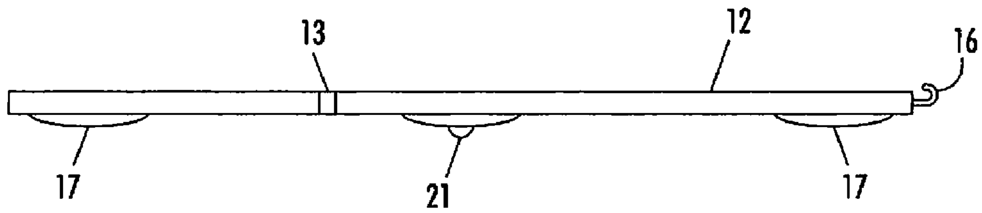
FIG. 6B is a side view of the transfer plate with slides or bearings.
Figure 6C:
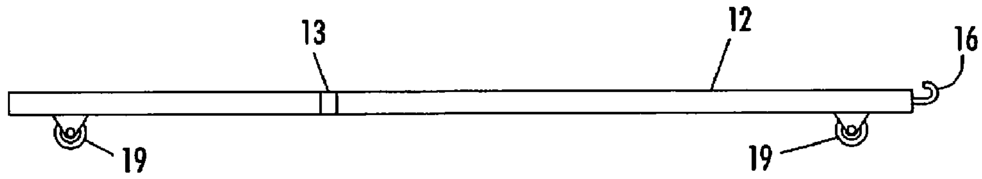
FIG. 6C is a side view of the transfer plate with wheels at its bottom surface.

In FIG. 6A, the top surface of transfer plate 12 is shown with only two slots 13, however, any suitable number of slots 13 may be used. A hook 16 is shown on at least one side portion of transfer plate 12, however, any number of hooks 16 or other remover means may be used. In FIG. 6B, a side view of transfer plate 12 is shown. In 6B, the sliders 17 or bearings 21 extend beyond the lower surface of transfer plate 12. Slides 17 alone or in a mixture with bearings 21 may be used if suitable. Also, mixtures of the three movables, slides, wheels and bearings may be used in the bottom portion of the stacker plate 12 or bottom portion of the transfer plate 2, if desirable. Shown also is hook 16 and slots 13 in a side view. In FIG. 6C, a transfer plate 12 is illustrated having wheels 19 on its lower surface.

Figure 7A:
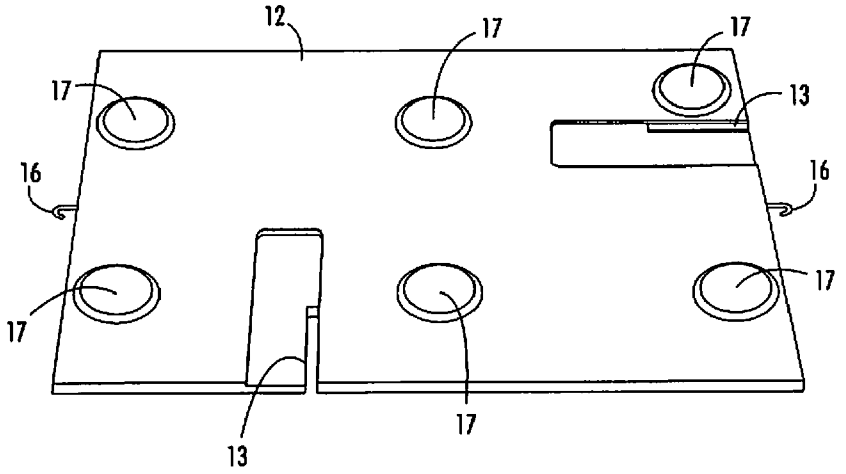
FIGS. 7A-7C illustrate embodiments of the bottom surface of the transfer plate with a different number and shapes of sliders. These same sliders can be used as movables in the stacker plate.
Figure 7B:
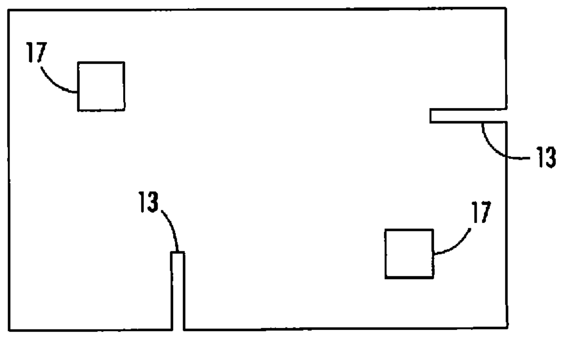
Figure 7C:
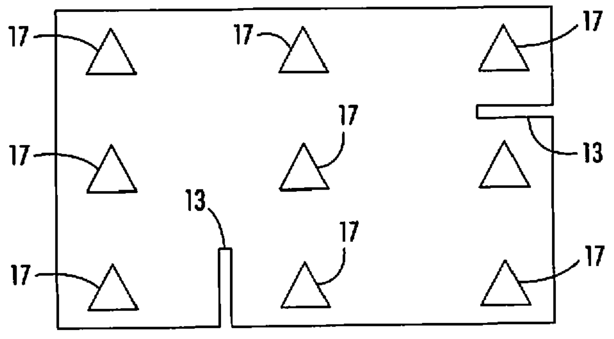

In FIGS. 7A to 7C, the bottom surface of sliding plate 12 is shown having various numbers of sliders 17. The sliders 17 are made from smooth, hard, slidable materials such as Magic Sliders (a trademark of Magic Sliders, L.P.). The sliders 17 can be of any suitable material or configuration such as round (shown in FIG. 7A) square (shown in FIG. 7B) or triangular (shown in FIG. 7C). It is preferred to use round sliders 17 for easier sliding motion. A preferred material for these sliders 17 is a high molecular weight polyethylene; however, any suitably slidable material can be used. A mixture of round, square and triangular sliders may be used, if desirable. While the bottom surface of transfer plate 12 is shown in FIGS. 7A-7C, these illustrated sliders 17 and also used in one embodiment at the bottom of stacker plate 2.

Figure 8A:
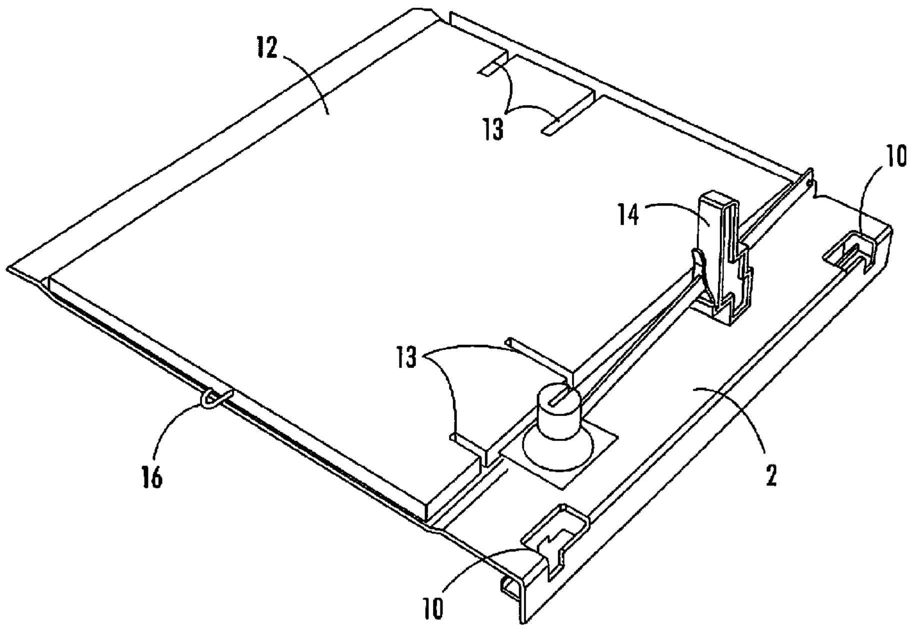
FIG. 8A illustrates the stacker plate of this invention with multiple slots having a clamp in one slot.
Figure 8B:
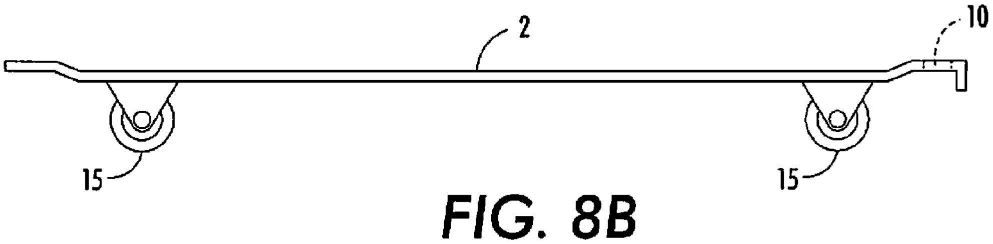
FIG. 8B shows the stacker plate with wheels as movables.
Figure 8C:
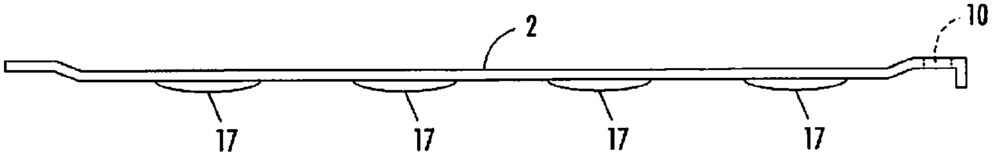
FIG. 8C shows the stacker plate with slides or bearings as its movables.

In FIG. 8A, a top view of stacker cart 2 is shown where the transfer plate 12 positioned on the stacker plate 2 has several slot openings 13. Stacker plate or cart 2 is shown ready to be inserted into finisher 7 prior to stacking paper 8. FIG. 8B illustrates the stacker plate 2 with wheels 15 on its lower surface. In FIG. 8C, the stacker plate 2 has sliders 21 or bearings 17 on its lower surface. These bearings or sliders extend beyond the lower surface of stacker cart or plate 2. Handle apertures 10 are shown in dotted lines in FIGS. 8B and BC.

FIG. 9 shows the pulling (via hook 16) of the loaded movable or sliding plate 12 from the top surface of stacker cart 2. Once the movable or sliding plate 12 is pulled off stacker plate or cart 2, it can be lifted to another surface by the lifting mechanism of co-pending patent applications Ser. Nos. 12/209,287 and 12/209,539, the disclosures of which are incorporated by reference into the present disclosure, or can be transferred to any other surface merely by pulling movable or sliding plate 12 off the stacker cart 2. In the embodiment shown in FIG. 9, a rope 20 is attached to hook 16 and sliding plate 12 pulled into a new surface 18. Sliding or movable plate 12 can be transferred from stacker plate or cart 2 to any desirable surface such as a desk top, a table top, another copier, etc. By "hook" in this disclosure and claims means any suitable remover means to pull movable plate 12 off said stacker plate or cart 2.

Figure 10:
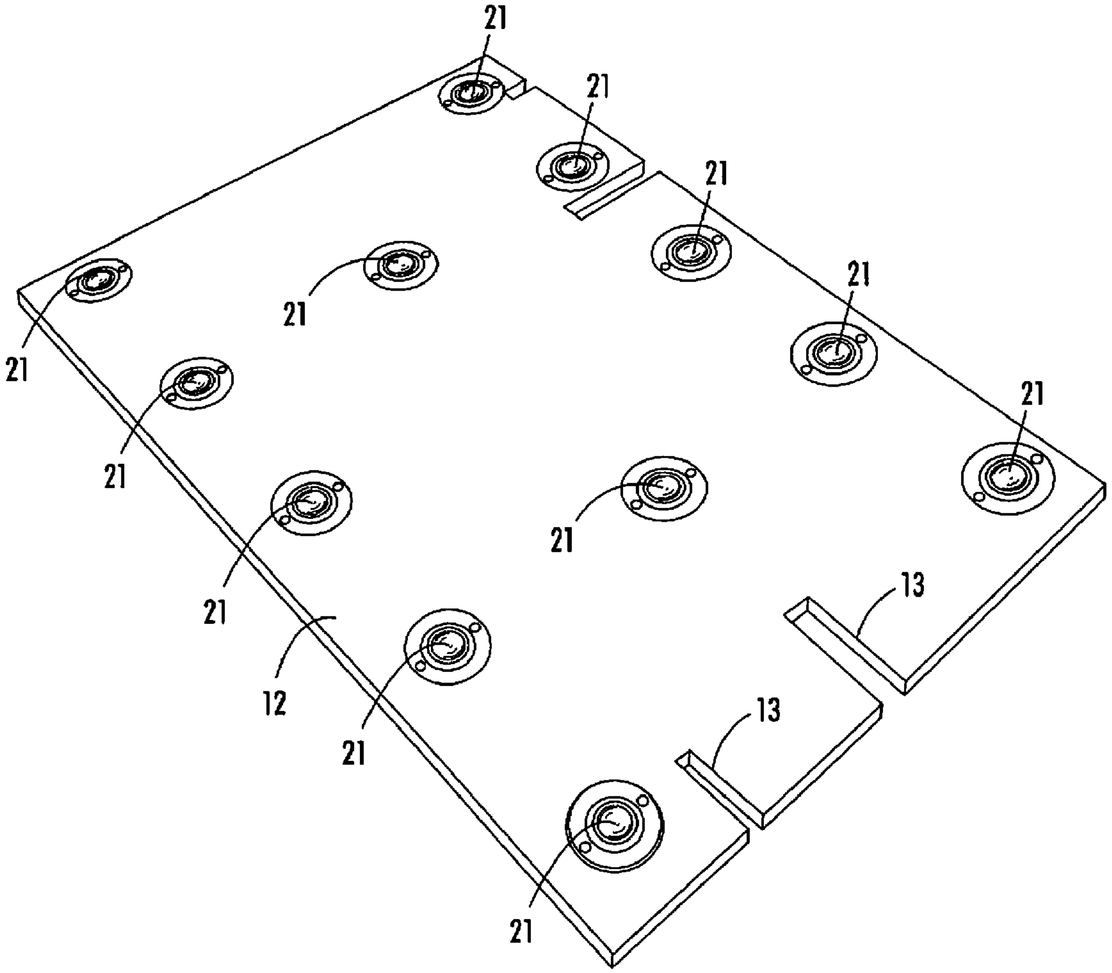
FIG. 10 illustrates the bearings that can be used at the bottom of the stacker plate or cart or the transfer plate of this invention.

In FIG. 10 an embodiment of movable plate 12 is shown having bearings 21 as movables on its lower surface. These same bearings 21 are used at the bottom of the stacker plate 2 as movables, but for clarity and brevity, bearings 21 that are used in both the movable plate 12 and stacker plate 2 are only shown re: the movable plate. It should be understood, however, that in embodiments of the stacker plate 2 these same bearings are used.

Figure 11:
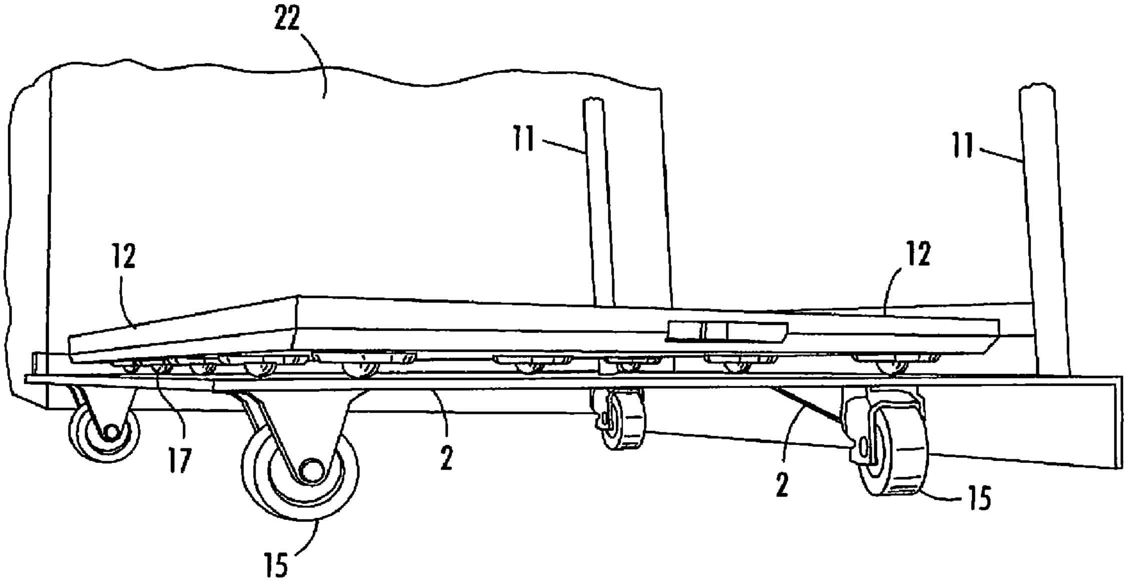
FIG. 11 illustrates an embodiment of the present invention where the stacker plate or cart has wheels as movables and the transfer plate has slides or bearings as movables on its lower surface.

In FIG. 11, the stacker plate or cart 2 is shown in one embodiment as having wheels 15 as movables, and the movable plate 12 has slides 17 and/or bearings 21 on its lower surface as movables. Handle 11 is shown attached to the stacker cart 2 for easy moving the stacker cart or plate 2, movable plate 12 and a load 22 of stacked paper or any other material.

In summary, this invention provides a stacker cart assembly for collecting a paper stack. This stacker cart assembly comprises an upper receiving surface, wheels located at its lower portion for moving the stacker cart and a transfer plate positioned in the upper receiving surface. The transfer plate comprises on its bottom or lower surface a plurality of movables. The transfer plate comprises slots at its edge portions and at least one hook. This hook is configured to be used when pulling or removing the transfer plate from the stacker cart.

The stacker cart has apertures configured to mate with an elongated inverted U-shaped handle when moving the stacker plate or cart to and from a housing. The movables in the transfer plate extend vertically beyond the lower surface and are enabled to permit the transfer plate to easily move off the stacker cart. The slots are used to accommodate various size paper stacks supported on the transfer plate. The transfer plate can comprise from 2-9 separate movables. The transfer or sliding plate has at least two slots on its side portions, at least one hook on its side portions and at least two to six movables on its bottom surface.

In another embodiment, this invention provides a stacker cart for collecting a paper stack of papers processed in a finishing station. The stacker cart comprises an upper receiving surface, a bottom surface with movables adapted to permit easy moving of the stacker cart, apertures located at its side portions to permit connection to a handle for easy moving of the stacker cart into and out of a stacker cart housing and a transfer plate movably located in the earlier-noted upper receiving surface. This transfer plate comprises a plurality of slots enabled to work with clamps to hold and accommodate various size paper stacks. The sliding or transfer plate has on its lower surface a plurality of movables configured to allow the transfer plate to move from the stacker plate cart to a second receiving surface. The sliding or transfer plate comprises at least one hook to be used when pulling the transfer plate from the upper receiving surface of the stacker cart.

The stacker cart of this invention can be used for collecting a paper stack of papers processed in a finishing module or station. This stacker plate or cart comprises an upper receiving surface, a bottom surface with wheels, bearings or slides adapted to permit easy moving of the stacker cart, apertures located at its side portions to permit connection to an inverted U-shaped handle for easy moving of the stacker cart into and out of a stacker cart housing and a sliding transfer plate movably located in the upper receiving surface. This sliding transfer plate comprises a plurality of slots enabled to work with clamps to hold and accommodate various size paper stacks.

The sliding or transfer plate has on its lower surface a plurality of wheels, bearings or sliders configured to allow the transfer plate to move from the stacker cart to a second receiving surface. The sliding or transfer plate comprises at least one hook to be used when pulling the transfer plate from the upper receiving surface of the stacker plate or cart and having at least two said slots on its side portions and at least 2-10 movables on its bottom surface.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A stacker cart assembly with stacking surface and transfer plate for stacking media, comprising:

a stacking surface including a top end and an opposite bottom end, the stacking surface having apertures at the top end for receiving a remover handle and wheels located at the opposite bottom end for moving the stacking surface;

a transfer plate positioned on the top end of the stacking surface to receive the media;

at least two slots on the transfer plate to receive at least one mechanism that can be adjusted to conform dimensionally to the media received on the transfer plate;

at least one clamp positioned in one of the at least two slots to hold a media stack in place at the transfer plate when transported away from the stacking surface;

a plurality of movables affixed at a bottom end of the transfer plate to support the transfer plate at the top end of the stacking surface and to move the transfer plate independently of the stacking surface; and at least one hook on an edge portion of the transfer plate to pull the transfer plate on to or away from the stacking surface;

wherein the at least two slots permit the transfer plate to accommodate various size media and to hold a media stack in place.

2. The stacker cart assembly of claim 1 wherein the apertures are configured to mate with an upwardly extending elongated U-shaped handle means when moving the stacking surface.

3. The stacker cart assembly of claim 1, wherein the plurality of movables affixed to transfer plate are at least two movables.

4. The stacker cart assembly of claim 3, wherein the plurality of movables affixed to the transfer plate are selected from a group consisting of wheels, slides, and bearings.

5. The stacker cart assembly of claim 1, wherein the transfer plate has at least two slots on its side portions, at least one hook on one of its side portions, and wherein the plurality of movables affixed to the transfer plate are at least four movables.

6. A stacker cart for collecting a paper stack of papers processed in a finishing station, the stacker cart comprising:

an upper receiving surface having a bottom surface with wheels adapted to permit moving of the stacker cart and apertures located at side portions to permit connection to an upwardly extending handle for the moving of the stacker cart into and out of a housing in the finishing station;

a transfer plate movably located on the upper receiving surface having a plurality of slots enabled to hold and accommodate various size paper stacks;

at least one clamp positioned in one of the plurality of slots to hold at the transfer plate a media stack in s lace when transported away from the upper receiving surface;

a plurality of movables affixed to the transfer plate configured to allow the transfer plate to move from the stacker cart to a second receiving surface; and at least one hook to be used when pulling the transfer plate from the upper receiving surface of the stacker cart;

wherein the movables on the transfer plate are selected from the group consisting of wheels, slides, and bearings.

7. The stacker cart of claim 6 wherein the apertures are configured to mate with an upwardly extending elongated U-shaped handle means when moving the stacking surface.

8. The stacker cart assembly of claim 6, wherein the plurality of movables affixed to the transfer plate are at least two movables.

9. The stacker cart assembly of claim 6, wherein the transfer plate has at least two slots on its side portions, at least one hook on one of its side portions, and at least four movables on the transfer plate bottom surface.

10. A stacker cart for collecting a paper stack of papers processed in a finishing station, the stacker cart comprising:

an upper receiving surface having a bottom surface with wheels adapted to permit easy moving of the stacker cart and apertures located at its side portions to permit connection to a handle for easy moving of the stacker cart into and out of a housing in the finishing station, and a transfer plate movably located on the upper receiving surface comprising:

a plurality of clamp enabled slots to hold and accommodate various size paper stacks on the transfer plate;

at least one clamp positioned in one of the plurality of clamp enabled slots to hold in place a paper stack on the transfer plate when transported away from the upper receiving surface;

a plurality of movables configured to allow the transfer plate to move to a second location or surface;

at least one hook to be used when pulling the transfer plate from the upper receiving surface of the stacker cart;

wherein the plurality of movables are selected from a group consisting of wheels, slides, and bearings.

11. The stacker cart of claim 10 wherein the transfer plate has from 2-9 sliders on its bottom surface, and the stacker cart has at least 4 wheels on the bottom surface.

12. The stacker cart of claim 10 wherein the plurality of movables is at least four movables affixed to the lower surface of the transfer plate.

13. The stacker cart of claim 10 wherein the stacker cart has four wheels at its lower surface.

14. The stacker cart of claim 10 wherein the stacker cart has slides on its lower surface.

15. The stacker cart of claim 10 wherein the stacker cart has bearings on its lower surface.

* * * * *